(12) United States Patent
Lin

(10) Patent No.: US 9,057,848 B2
(45) Date of Patent: Jun. 16, 2015

(54) OPTICAL FIBER CONNECTOR

(71) Applicant: HON HAI PRECISION INDUSTRY CO., LTD., New Taipei (TW)

(72) Inventor: I-Thun Lin, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/078,539

(22) Filed: Nov. 13, 2013

(65) Prior Publication Data
US 2015/0016781 A1 Jan. 15, 2015

(51) Int. Cl.
*G02B 6/36* (2006.01)
*G02B 6/38* (2006.01)

(52) U.S. Cl.
CPC .................... *G02B 6/3838* (2013.01)

(58) Field of Classification Search
CPC ....... G02B 6/3838; G02B 6/25; G02B 6/3847
USPC .......................................................... 385/85
See application file for complete search history.

(56) References Cited

U.S. PATENT DOCUMENTS

| 7,213,976 B2 * | 5/2007 | Tong et al. ....................... 385/82 |
| 7,377,700 B2 * | 5/2008 | Manning et al. ................. 385/72 |
| 8,523,459 B2 * | 9/2013 | Danley et al. ................... 385/85 |

* cited by examiner

*Primary Examiner* — Omar R Rojas
(74) *Attorney, Agent, or Firm* — Novak Druce Connolly Bove + Quigg LLP

(57) ABSTRACT

An optical fiber connector includes a first surface, a second surface parallel with the first surface, a third surface, and a fourth surface parallel with the third surface. A groove and a fiber hole are defined in the optical fiber connector. The groove includes a bottom surface and a side surface connected with the bottom surface. A distance between the bottom surface and the bottom of the fiber hole is b. The optical fiber connector follows the relationship: d≤b≤α/tgθ, a is equal to the length of the optical fiber extending out of the fourth surface, d is equal to the diameter of an optical fiber for being received in the fiber hole, and θ is equal to a half of an angle of a laser which is used to cut the optical fiber.

7 Claims, 4 Drawing Sheets

OPTICAL FIBER CONNECTOR

BACKGROUND

1. Technical Field

The present disclosure relates to an optical fiber connector.

2. Description of Related Art

Optical fiber connectors define holes (through holes or blind holes, generally through holes) for holding optical fibers. The optical fibers are inserted into the holes and excessive part of each optical fiber is cut by laser beam.

The laser beam has a certain focusing angle, in other words, the laser beam has a shape of cone. During cutting the optical fibers, end portions of the optical fibers may be burned by the laser beam.

Therefore, it is desirable to provide an optical fiber connector which can overcome the limitation described.

BRIEF DESCRIPTION OF THE DRAWINGS

The components of the drawings are not necessarily drawn to scale, the emphasis instead being placed upon clearly illustrating the principles of the embodiments of the present disclosure. Moreover, in the drawings, like reference numerals designate corresponding parts throughout several views.

DETAILED DESCRIPTION

Figure 1:
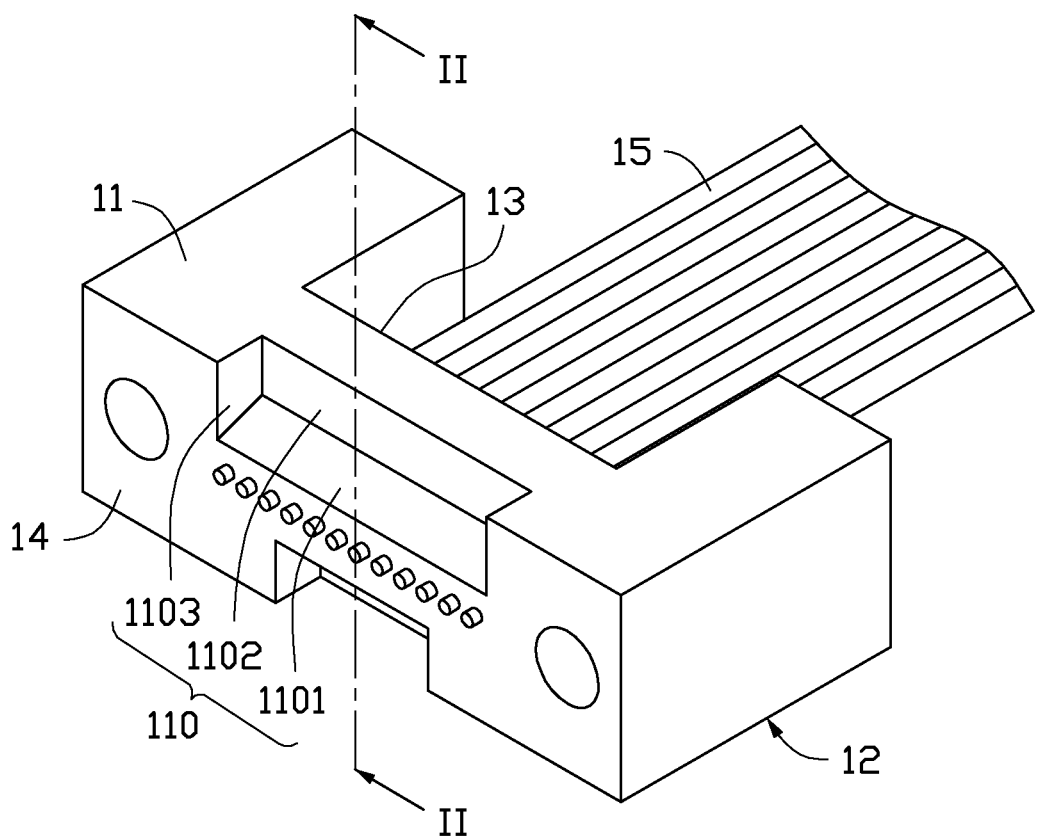
FIG. 1 is a schematic view of an optical fiber connector, according to a first embodiment of the present disclosure.
Figure 2:
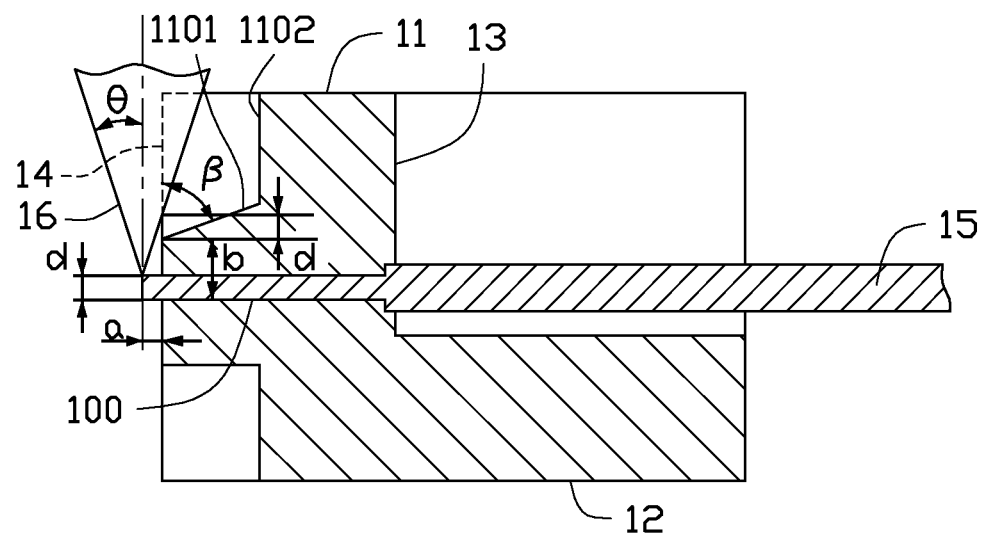
FIG. 2 is a schematic view of cutting optical fibers receiving in the optical fiber connector of FIG. 1 using laser beam.

FIG. 1 and FIG. 2 show an optical fiber connector 10 according to a first embodiment.

The optical fiber connector 10 is substantially in a rectangular shape. The optical fiber connector 10 includes a first surface 11, a second surface 12, a third surface 13, and a fourth surface 14. The second surface 12 is parallel with the first surface 11. The third surface 13 intersects with the first surface and the second surface 12. The fourth surface 14 is parallel with the third surface 13. The fourth surface 14 intersects with the first surface 11 and the second surface 12. Through holes 100 are defined from the third surface 13 toward the fourth surface 14. The through holes 100 are configured for fixing optical fibers 15. All of bottoms of the through holes 100 are on an identical plane. Each optical fiber 15 extends out of the fourth surface 14. The diameter of each optical fiber 15 is labeled d. A groove 110 is defined in an intersection of the first surface 11 and the fourth surface 14. The groove 110 includes a bottom surface 1101, a first side surface 1102, and two second side surfaces 1103 facing each other. The first side surface 1102 is sandwiched between the two second side surfaces 1103. The two side surfaces 1103 may be parallel with each other or intersect with each other. In this embodiment, the two side surfaces 1103 are parallel with each other.

All of the through holes 100 are under the bottom surface 1101 of the groove 110.

The bottom surface 1101 is an inclined plane. An included angle labeled 13 is between the bottom surface 1101 and the fourth surface 14. Minimum distance between the bottom surface 1101 and the bottom of the through hole 100 is labeled b.

The optical fibers 15 are fixed inside the through holes 100. A laser beam 16 is used to cut the excessive parts of each of the optical fibers 15 so that the optical fibers 15 each keep a section having a length extending out of the fourth surface 14. The laser beam 16 has a focusing angle labeled 2θ. In this embodiment, a value of θ is 10 degrees. During cutting, center line of the laser beam 16 is perpendicular to center line of each optical fiber 15. a, b, d and θ must match the following relationship in order to prevent burning the optical fibers 15. The following relationship is d≤b≤a/tgθ and β≥θ. Wherein, tgθ means a tangent function of the angle θ defined as a ratio of the length of the opposite side to the length of the adjacent side of a right triangle including the angle θ.

Under the relationship of b=α/tgθ and β=θ, when the laser beam 16 cuts the bottoms of the optical fibers 15, the laser beam 16 exactly intersects with the bottom surface 1101. In other words, the laser beam 16 moves down d, the laser beam 16 exactly intersects with the bottom surface 1101. Under the relationship of b<α/tgθ, β≥θ, the laser beam 16 cannot contact the optical fiber connector 10 during cutting.

Figure 3:
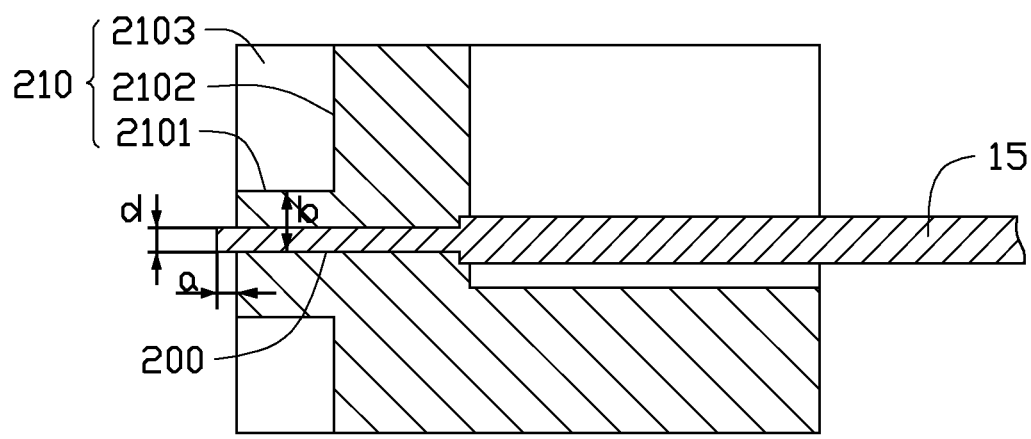
FIG. 3 is a sectional view of an optical fiber connector, according to a second embodiment of the present disclosure.

FIG. 3 shows an optical fiber connector 20, according to a second embodiment. The optical fiber connector 20 of FIG. 3 is similar to the optical fiber connector 10 of FIGS. 1 and 2, except that the optical fiber connector 20 includes a groove 210 and through holes 200 for holding the optical fibers 15. The groove 210 includes a bottom surface 2101, a first side surface 2102, and a second side surface 2103. The bottom surface 2101 is perpendicular with the first surface 2102 and the second surface 2103.

A distance between the bottom surface 2101 and the bottom of the through holes 200 is b. The optical fiber connector 20 matches the following relationship in order to prevent burning the optical fibers 15. The following relationship is d≤b≤α/tgθ, the meanings of α, d, and θ are the same as the first embodiment.

Under the condition of b=α/tgθ, the laser beam 16 exactly intersects with the bottom surface 2101. Under the relationship of b<α/tgθ, the laser beam 16 cannot contact the optical fiber connector 20 during cutting.

Figure 4:
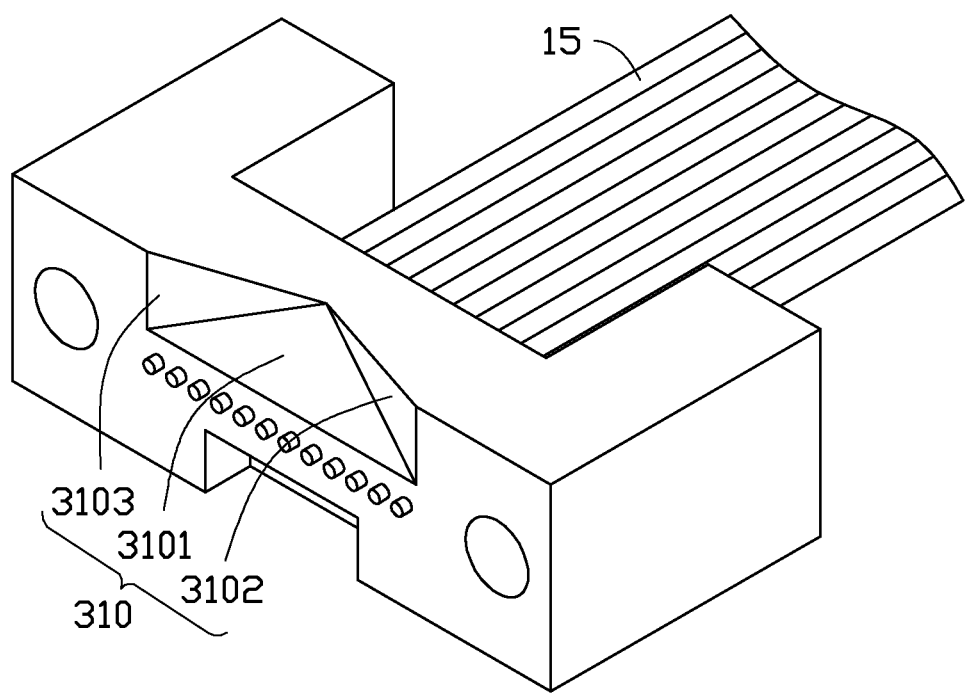
FIG. 4 is a schematic view of an optical fiber connector, according to a third embodiment of the present disclosure.

In a third embodiment, shown in FIG. 4, an optical fiber connector 30 is similar to the optical fiber connector 10 of FIGS. 1 and 2, except that the optical fiber connector 30 defines a groove 310. The groove 310 includes a first side surface 3102, a second side surface 3103, and a bottom surface 3101. The first side surface 3102 intersects with the second surface 3103 and the bottom surface 3101.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being exemplary embodiments of the disclosure.

What is claimed is:

1. An optical fiber connector, comprising:
   a first surface;
   a second surface parallel with the first surface;
   a third surface connected with the first surface and the second surface; and
   a fourth surface parallel with the third surface; wherein
   the optical fiber connector defines a through hole extending through the third surface and the fourth surface, the through hole is configured for holding an optical fiber;
   the optical fiber connector defines a groove in an intersection of the first surface and the fourth surface, the groove comprises a bottom surface and a first side surface connected with the bottom surface, a minimum distance between the bottom surface and a bottom of the through hole is b, b matches the following relationship: $d \leq b \leq a/tg\theta$, d is a diameter of the optical fiber, a is a length of a section of the optical fiber extending out of the through hole, θ is one half of focusing angle of a laser beam for cutting the optical fiber, and tgθ means a tangent function of the angle θ.

2. The optical fiber connector of claim 1, wherein the bottom surface is an inclined plane, and an included angle between the bottom surface and the fourth surface is larger than and equal to θ.

3. The optical fiber connector of claim 2, wherein the value of θ is 10 degrees.

4. The optical fiber connector of claim 1, wherein the optical fiber connector comprises two second side surfaces, the first side surface is connected between the two second side surfaces.

5. The optical fiber connector of claim 4, wherein the first side surface is perpendicular to the second side surfaces and the bottom surface.

6. The optical fiber connector of claim 4, wherein the bottom surface is inclined to the first side surface and the second side surfaces.

7. The optical fiber connector of claim 1, wherein the optical fiber connector comprises a second side surface, and the second side surface intersections with the first side surface and the bottom surface.

\* \* \* \* \*